(12) United States Patent
Kitahara et al.

(10) Patent No.: US 11,394,083 B2
(45) Date of Patent: Jul. 19, 2022

(54) SECONDARY BATTERY SEPARATOR INCLUDING POROUS FILM HAVING FLUORINE-CONTAINING POLYMER OF VINYLIDENE FLUORIDE, TETRAFLUOROETHYLENE, AND VINYL CARBOXYLIC ACID OR SALT AND SECONDARY BATTERY INCLUDING THE SAME

(71) Applicant: DAIKIN INDUSTRIES, LTD., Osaka (JP)

(72) Inventors: Takahiro Kitahara, Osaka (JP); Manabu Fujisawa, Osaka (JP); Takashi Iguchi, Osaka (JP); Kazuya Asano, Osaka (JP); Chihiro Shinoda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 171 days.

(21) Appl. No.: 16/610,591

(22) PCT Filed: Mar. 27, 2018

(86) PCT No.: PCT/JP2018/012366
§ 371 (c)(1),
(2) Date: Nov. 4, 2019

(87) PCT Pub. No.: WO2018/216348
PCT Pub. Date: Nov. 29, 2018

(65) Prior Publication Data
US 2020/0067052 A1  Feb. 27, 2020

(30) Foreign Application Priority Data

May 26, 2017 (JP) ............................. JP2017-104879

(51) Int. Cl.
*H01M 50/446* (2021.01)
*C08F 214/22* (2006.01)
*C08F 214/26* (2006.01)
*H01M 10/0525* (2010.01)
*H01M 10/058* (2010.01)
*H01M 4/02* (2006.01)

(52) U.S. Cl.
CPC ......... *H01M 50/446* (2021.01); *C08F 214/22* (2013.01); *C08F 214/26* (2013.01); *H01M 10/058* (2013.01); *H01M 10/0525* (2013.01); *H01M 2004/027* (2013.01); *H01M 2004/028* (2013.01)

(58) Field of Classification Search
CPC ........... H01M 50/446; H01M 10/0525; H01M 10/058; C08F 214/22; C08F 214/26
USPC .................... 429/129, 144, 249, 251, 254
See application file for complete search history.

(56) References Cited

U.S. PATENT DOCUMENTS

| | | | |
|---|---|---|---|
| 2010/0255378 A1* | 10/2010 | Bonnet | H01M 4/13 429/231.95 |
| 2015/0179996 A1 | 6/2015 | Inaba et al. | |
| 2015/0280196 A1 | 10/2015 | Ichisaka et al. | |
| 2019/0296359 A1* | 9/2019 | Asano | C08F 214/22 |
| 2020/0058914 A1* | 2/2020 | Kusada | H01M 50/449 |

FOREIGN PATENT DOCUMENTS

| | | |
|---|---|---|
| EP | 3 070 764 A1 | 9/2016 |
| EP | 3 447 831 A1 | 2/2019 |
| ER | 3 680 969 A1 | 7/2020 |
| JP | 07-201316 A | 8/1995 |
| JP | 5757363 B1 | 7/2015 |
| WO | 2014/002937 A1 | 1/2014 |
| WO | 2014/065258 A1 | 5/2014 |
| WO | 2015/083790 A1 | 6/2015 |
| WO | WO-2016076371 A * | 5/2016 ............. H01G 11/38 |

OTHER PUBLICATIONS

Extended European Search Report dated Dec. 21, 2020, issued by the European Patent Office in application No. 18805302.9.
International Search Report of PCT/JP2018/012366 dated May 29, 2018 [PCT/ISA/210].
International Preliminary Report on Patentability with Translation of Written Opinion dated Nov. 26, 2019, in International Application No. PCT/JP2018/012366.

* cited by examiner

*Primary Examiner* — Sean P Cullen
(74) *Attorney, Agent, or Firm* — Sughrue Mion, PLLC

(57) ABSTRACT

A secondary battery separator including a porous substrate and a porous film firmly bonded to each other, the porous film being disposed on or above the porous substrate. The porous film contains a fluorine-containing polymer that contains a polymerized unit based on vinylidene fluoride, a polymerized unit based on tetrafluoroethylene, and a polymerized unit based on a monomer represented by the following formula (2-2):

$$R^5R^6C=CR^7R^8CO_2Y^1 \quad (2\text{-}2)$$

wherein $R^5$, $R^6$, and $R^7$ are each independently a hydrogen atom or a C1-C8 hydrocarbon group; $R^8$ is a C1-C8 hydrocarbon group; and $Y^1$ is an inorganic cation and/or an organic cation. Also disclosed is a secondary battery including the secondary battery separator; a positive electrode; a negative electrode; and a non-aqueous electrolyte solution.

5 Claims, No Drawings

SECONDARY BATTERY SEPARATOR INCLUDING POROUS FILM HAVING FLUORINE-CONTAINING POLYMER OF VINYLIDENE FLUORIDE, TETRAFLUOROETHYLENE, AND VINYL CARBOXYLIC ACID OR SALT AND SECONDARY BATTERY INCLUDING THE SAME

CROSS REFERENCE TO RELATED APPLICATIONS

This application is a National Stage of International Application No. PCT/JP2018/012366, filed Mar. 27, 2018, claiming priority to Japanese Patent Application No. 2017-104879, filed May 26, 2017.

TECHNICAL FIELD

The invention relates to secondary battery separators and secondary batteries. The invention specifically relates to a separator suitable for a secondary battery such as a lithium secondary battery, and a secondary battery including the same.

BACKGROUND ART

Non-aqueous secondary batteries typified by lithium secondary batteries have high energy density and are widespread as main power supplies for mobile electronic devices such as mobile phones and notebook computers. Further, use of non-aqueous secondary batteries, such as use thereof for electric vehicles (EVs), is expected as one of decisive countermeasures against global warming. Lithium secondary batteries are desired to have much higher energy density and much better battery characteristics. To ensure the safety is also a technical issue.

A lithium secondary battery has a basic structure including a non-aqueous electrolyte solution between a positive electrode and a negative electrode, optionally with a separator in between. The separator is interposed between the positive electrode and the negative electrode to prevent contact of the active materials of the electrodes and allows the electrolyte solution to pass through the pores of the separator to form an ion conductive pathway between the electrodes. In case of abnormal current flow in the battery due to, for example, a short circuit between the positive electrode and the negative electrode, the separator needs to have a function (shutdown function) of breaking such a current to prevent over current. If the temperature of the battery exceeds a normal use temperature thereof, the separator closes its microporous film to achieve shutdown.

Common separators conventionally used are microporous polyolefin films formed from, for example, polyethylene or polypropylene. Some recent studies have aimed at improving the performance of such separators to improve the characteristics and safety of batteries.

For example, Patent Literature 1 proposes a secondary battery separator including: a porous substrate; and a composite porous film disposed on or above the porous substrate, the composite porous film including: a fluorine-containing polymer that includes a polymerized unit based on vinylidene fluoride and a polymerized unit based on tetrafluoroethylene; and at least one particulate inorganic substance selected from the group consisting of a particulate metal oxide and a particulate metal hydroxide, the fluorine-containing polymer including 40 mol % or more of the polymerized unit based on vinylidene fluoride in all polymerized units and 5 mol % or more of the polymerized unit based on tetrafluoroethylene in all polymerized units, having a weight average molecular weight of 200000 to 2000000, the fluorine-containing polymer being present in an amount of 50% by mass or less in the composite porous film.

Patent Literature 2 proposes a method for producing a resin film for a non-aqueous electrolyte secondary battery, the method including: coating a separator with a resin composition containing a solvent and a vinylidene fluoride copolymer obtained by copolymerizing vinylidene fluoride and a compound represented by the following formula (1):

[Chem. 1]

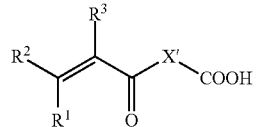

(1)

(wherein $R^1$, $R^2$, and $R^3$ are each independently a hydrogen atom, a chlorine atom, or an alkyl group having from 1 to 5 carbon atoms; and X' is an atomic group having a molecular weight of 472 or less and having a main chain constituted by 1 to 19 atoms) (coating step); and drying the separator on which the resin composition has been coated (drying step).

CITATION LIST

Patent Literature

Patent Literature 1: JP 5757363 B
Patent Literature 2: WO 2014/002937

SUMMARY OF INVENTION

Technical Problem

The invention aims to provide a secondary battery separator that includes a porous substrate and a porous film firmly bonded to each other and has excellent low-temperature processability and electrolyte solution resistance.

The invention also aims to provide a secondary battery having excellent high-temperature cycle performance.

Solution to Problem

The invention relates to a secondary battery separator including a porous substrate and a porous film on or above the porous substrate, the porous film containing a fluorine-containing polymer that contains a polymerized unit based on vinylidene fluoride, a polymerized unit based on tetrafluoroethylene, and a polymerized unit based on a monomer (2-2) represented by the following formula (2-2):

[Chem. 2]

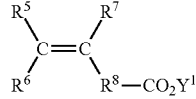

(2-2)

wherein $R^5$, $R^6$, and $R^7$ are each independently a hydrogen atom or a C1-C8 hydrocarbon group; $R^8$ is a C1-C8 hydrocarbon group; and $Y^1$ is an inorganic cation and/or an organic cation.

The porous film preferably further contains at least one particulate inorganic substance selected from the group consisting of a particulate metal oxide and a particulate metal hydroxide.

The porous film preferably further contains a particulate organic substance.

The porous substrate is preferably formed from at least one resin selected from the group consisting of polyethylene, polypropylene, polyimide, polyamide, polyethylene terephthalate, polyester, and polyacetal.

The invention also relates to a secondary battery including the secondary battery separator, a positive electrode, a negative electrode, and a non-aqueous electrolyte solution.

Advantageous Effects of Invention

The secondary battery separator of the invention has any of the above structures, so that the porous substrate and the porous film constituting the separator are firmly bonded to each other and the secondary battery separator has excellent low-temperature processability and electrolyte solution resistance.

The secondary battery of the invention includes the secondary battery separator of the invention, so that it has excellent high-temperature cycle performance.

DESCRIPTION OF EMBODIMENTS

The invention will be specifically described hereinbelow.

The separator of the invention includes a porous substrate and a porous film on or above the porous substrate, the porous film containing a fluorine-containing polymer that contains a polymerized unit based on vinylidene fluoride, a polymerized unit based on tetrafluoroethylene, and a polymerized unit based on a monomer (2-2) represented by the following formula (2-2):

[Chem. 3]

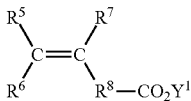

(2-2)

wherein $R^5$, $R^6$, and $R^7$ are each independently a hydrogen atom or a C1-C8 hydrocarbon group; $R^8$ is a C1-C8 hydrocarbon group; and $Y^1$ is an inorganic cation and/or an organic cation.

The separator of the invention includes the porous film containing a fluorine-containing polymer. Thus, the porous substrate and the porous film are firmly bonded to each other and the separator has excellent low-temperature processability and electrolyte solution resistance. This allows the porous film to be less easily peeled from the porous substrate during the process of producing a secondary battery and in an operating environment. Further, the porous structure is not broken (blocked) at a press processing temperature and the ion permeability is not impaired, whereby the separator can provide good battery characteristics. In addition, the separator is less dissolved or swelled in an organic solvent for electrolyte salt dissolution, which constitutes an electrolyte solution of a secondary battery, to be described later. This allows the resulting secondary battery to have excellent durability and high-temperature cycle performance.

The separator of the invention also has excellent adhesiveness to electrodes constituting a secondary battery and low-pressure processability.

The fluorine-containing polymer contains a polymerized unit based on the monomer (2-2). The monomer (2-2) has a specific functional group, which allows firm bonding between the porous substrate and the porous film.

The monomer (2-2) is a monomer represented by the following formula (2-2). One or two or more monomers (2-2) may be used.

[Chem. 4]

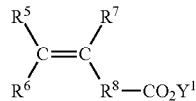

(2-2)

In the formula, $R^5$, $R^6$, and $R^7$ are each independently a hydrogen atom or a C1-C8 hydrocarbon group; $R^8$ is a C1-C8 hydrocarbon group; and $Y^1$ is an inorganic cation and/or an organic cation.

In the formula (2-2), $Y^1$ is an inorganic cation and/or an organic cation. Examples of the inorganic cation include cations such as H, Li, Na, K, Mg, Ca, Al, and Fe. Examples of the organic cation include cations such as $NH_4$, $NH_3R^x$, $NH_2R^x{}_2$, $NHR^x{}_3$, and $NR^x{}_4$ (wherein $R^x$s are each independently a C1-C4 alkyl group). $Y^1$ is preferably H, Li, Na, K, Mg, Ca, Al, and/or $NH_4$, more preferably H, Li, Na, K, Mg, Al, and/or $NH_4$, still more preferably H, Li, Al, and/or $NH_4$. It should be noted that these specific examples of the inorganic and organic cations are mentioned without the sign and valence for convenience.

In the formula (2-2), $R^5$, $R^6$, and $R^7$ are each independently a hydrogen atom or a C1-C8 hydrocarbon group. The hydrocarbon group is a monovalent hydrocarbon group. The hydrocarbon group preferably has a carbon number of 4 or smaller. Examples of the hydrocarbon group include alkyl groups, alkenyl groups, and alkynyl groups of the above carbon number, and preferred examples thereof include a methyl group and an ethyl group. $R^5$ and $R^6$ are each independently preferably a hydrogen atom, a methyl group, or an ethyl group, and $R^7$ is preferably a hydrogen atom or a methyl group.

In the formula (2-2), $R^8$ is a C1-C8 hydrocarbon group. The hydrocarbon group is a divalent hydrocarbon group. The hydrocarbon group preferably has a carbon number of 4 or smaller. Examples of the hydrocarbon group include alkylene groups and alkenylene groups of the above carbon number, and preferred examples thereof include a methylene group, an ethylene group, an ethylidene group, a propylidene group, and an isopropylidene group. A methylene group and an ethylene group are more preferred.

Particularly preferred examples of the monomer (2-2) include vinylacetic acid (3-butenoic acid) and salts thereof, 3-pentenoic acid and salts thereof, 4-pentenoic acid and salts thereof, 3-hexenoic acid and salts thereof, 4-hexenoic acid and salts thereof, and 5-hexenoic acid and salts thereof.

In the fluorine-containing polymer, the polymerized unit based on the monomer (2-2) is preferably in an amount of 0.05 to 2.0 mol % of all polymerized units. The polymerized unit contained in an amount within the above range enables more firm bonding between the porous substrate and the porous film and can lead to a separator having much better low-temperature processability and electrolyte solution resistance. The amount of the polymerized unit is more preferably 0.10 mol % or more, still more preferably 0.30 mol % or more, furthermore preferably 0.40 mol % or more, while more preferably 1.5 mol % or less.

The fluorine-containing polymer contains a polymerized unit based on vinylidene fluoride. This allows the separator to have excellent oxidation resistance and electrolyte solution resistance.

The fluorine-containing polymer contains a polymerized unit based on tetrafluoroethylene. This allows the separator to have excellent low-temperature processability, electrolyte solution resistance, flexibility, and chemical resistance (especially, alkali resistance and oxidation resistance).

In the fluorine-containing polymer, preferably, the polymerized unit based on vinylidene fluoride is in an amount of 50 to 95 mol % of all polymerized units and the polymerized unit based on tetrafluoroethylene is in an amount of 4.8 to 49.95 mol % of all polymerized units. The polymerized unit based on vinylidene fluoride and the polymerized unit based on tetrafluoroethylene in amounts within the above respective ranges allow the fluorine-containing polymer to have a melting point that is equal to or lower than the melting point of a porous substrate such as polyolefin (usually 100° C. to 160° C.) and allow the fluorine-containing polymer to have a reduced elastic modulus. This can reduce the temperature and pressure in the process of producing the separator including the porous film and in the press processing of the separator and the electrodes, enabling processing without breaking the porous structure of the porous substrate. Thereby, a separator can be obtained in which the porous substrate and the porous film are more firmly bonded to each other and which has much better electrolyte solution resistance and can improve the capacity characteristics and charge and discharge durability of a battery. More preferably, the amount of the polymerized unit based on vinylidene fluoride is 60 to 90 mol % and the amount of the polymerized unit based on tetrafluoroethylene is 9.8 to 39.95 mol %.

The upper limit of the amount of the polymerized unit based on vinylidene fluoride may be 94 mol % or may be 89 mol %.

In order to enable significant achievement of the above effects, the amount of the polymerized unit based on vinylidene fluoride is preferably 74 mol % or less, more preferably 70 mol % or less.

The upper limit of the amount of the polymerized unit based on tetrafluoroethylene may be 49 mol % or may be 39 mol %.

In order to enable significant achievement of the above effects, the amount of the polymerized unit based on tetrafluoroethylene is preferably 40 mol % or less, more preferably 35 mol % or less, while preferably 25 mol % or more.

As long as the fluorine-containing polymer contains the polymerized unit based on vinylidene fluoride, the polymerized unit based on tetrafluoroethylene, and the polymerized unit based on the monomer (2-2), it may further contain a polymerized unit based on a different monomer copolymerizable with these monomers.

Examples of the different monomer to be used include vinyl fluoride, trifluoroethylene, chlorotrifluoroethylene, fluoroalkyl vinyl ether, hexafluoropropylene, 2,3,3,3-tetrafluoropropene, and propylene. In order to give good flexibility and chemical resistance, particularly preferred are hexafluoropropylene and 2,3,3,3-tetrafluoropropene.

In the case of using any of these different monomers, the amount of the polymerized unit based on the different monomer(s) is preferably 0.1 to 50 mol % of all the polymerized units.

The composition of the fluorine-containing polymer can be determined using an NMR analyzer.

In order to prepare a uniform porous film, the fluorine-containing polymer preferably has a weight average molecular weight (polystyrene equivalent) of 150000 to 2000000. The weight average molecular weight is more preferably 300000 to 1700000, still more preferably 500000 to 1500000.

The weight average molecular weight can be determined by gel permeation chromatography (GPC) using N,N-dimethylformamide as a solvent at 50° C.

In order to improve the battery characteristics, the fluorine-containing polymer preferably has a number average molecular weight (polystyrene equivalent) of 40000 to 1000000. The number average molecular weight is more preferably 130000 to 600000.

The number average molecular weight can be determined by gel permeation chromatography (GPC) using N,N-dimethylformamide as a solvent at 50° C.

The fluorine-containing polymer preferably has a melting point of 155° C. to 100° C. The fluorine-containing polymer having a melting point within the above range allows the separator to have much better low-temperature processability. The melting point is more preferably 145° C. to 110° C., still more preferably 143° C. to 120° C.

The melting point can be determined as follows. Using a differential scanning calorimeter (DSC), the temperature of the polymer is increased and decreased from room temperature to 200° C. and vice versa at a rate of 10° C./min, and the temperature corresponding to the maximum value on a heat-of-fusion curve obtained in the second heating is defined as the melting point.

The fluorine-containing polymer preferably has an elongation at break of 100% or higher. The polymer having an elongation at break of 100% or higher can further improve the flexibility of the separator. The elongation at break is more preferably 200% or higher, still more preferably 300% or higher.

The elongation at break can be determined by the following method. Specifically, the fluorine-containing polymer is weighed and dissolved in N-methyl-2-pyrrolidone (NMP) such that the concentration is 5% by mass, whereby a fluorine-containing polymer solution is prepared. The fluorine-containing polymer solution is cast on a glass plate and dried at 100° C. for five hours, so that a film having a thickness of about 30 μm is obtained. The film is then punched into a dumbbell shape, and the elongation at break thereof is measured using an autograph at 25° C.

The fluorine-containing polymer preferably has a storage modulus of 1000 MPa or lower at 25° C. The fluorine-containing polymer having a storage modulus of 1000 MPa or lower at 25° C. can furthermore improve the flexibility of the separator. The storage modulus is more preferably 800 MPa or lower, still more preferably 600 MPa or lower. The storage modulus is also preferably 100 MPa or higher, more preferably 200 MPa or higher, still more preferably 250 MPa or higher.

The fluorine-containing polymer preferably has a storage modulus of 200 MPa or lower at 100° C. The fluorine-containing polymer having a storage modulus of 200 MPa or lower at 100° C. can furthermore improve the flexibility of the separator. The storage modulus is more preferably 160 MPa or lower, still more preferably 140 MPa or lower, furthermore preferably 110 MPa or lower. The storage modulus is also preferably 10 MPa or higher, more preferably 20 MPa or higher.

The storage modulus is a value measured at 25° C. or at 100° C. for a sample having a size of 30 mm in length, 5 mm in width, and 40 μm in thickness using a dynamic mechanical analyzer DVA220 available from IT Keisoku Seigyo K.K. by dynamic mechanical analysis in a tensile mode, at a grip width of 20 mm, a measurement temperature of −30° C. to 160° C., a temperature-increasing rate of 2° C./min, and a frequency of 1 Hz.

The measurement sample can be produced as follows. Specifically, for example, the fluorine-containing polymer is weighed and dissolved in N-methyl-2-pyrrolidone (NMP) such that the concentration is 8% by mass, whereby a fluorine-containing polymer solution is prepared. The fluorine-containing polymer solution is cast on a glass plate and dried at 100° C. for 12 hours, then at 100° C. for 12 hours in vacuo. The resulting film having a thickness of 40 μm is cut into a size of 30 mm in length and 5 mm in width, whereby the measurement sample is produced.

The fluorine-containing polymer preferably has a weight increase in relation to the swellability in electrolyte solution of 180% or lower at 60° C. The fluorine-containing polymer having a weight increase in relation to the swellability in electrolyte solution of 180% or lower enables maintenance of the peel strength between the porous substrate and the porous film even at high temperature and can minimize an increase in the Gurley value. This allows the resulting secondary battery to have excellent durability and excellent charge and discharge cycle performance at high temperature. In contrast, a fluorine-containing polymer exhibiting swellability in electrolyte solution with a weight increase of higher than 180% may fail to maintain the peel strength between the porous substrate and the porous film. In addition, the porous film may have a low porosity and, when containing a particulate metal oxide or a particulate metal hydroxide, may cause separation of the particles and entrance thereof into pores of the porous substrate. This may unfortunately result in a significant increase in the Gurley value. The weight increase in relation to the swellability in electrolyte solution is more preferably 160% or lower, still more preferably 145% or lower, while preferably 120% or higher.

The weight increase is a value determined by the following method.

An NMP solution (8% by mass) of the fluorine-containing polymer is cast on a glass Petri dish and vacuum dried at 100° C. for six hours. Thereby, a 200-μm-thick film of the fluorine-containing polymer is produced. The resulting film is cut to have a diameter of 10 mm. The piece is put into a sample bottle that contains an electrolyte solution (a solution of 1 M LiPF$_6$ dissolved in a solvent mixture of ethylene carbonate and ethyl methyl carbonate in a volume ratio of 3/7) and left at 60° C. for one week. Then, the weight increase is calculated by the following formula.

Weight increase (%)=(weight of film after immersion in electrolyte solution/weight of film before immersion in electrolyte solution)×100

Vinylidene fluoride, tetrafluoroethylene, the monomer (2-2), and optionally a different monomer(s) copolymerizable with these monomers may be copolymerized by any technique such as suspension polymerization, emulsion polymerization, or solution polymerization. In consideration of easy aftertreatment, for example, aqueous suspension polymerization or emulsion polymerization is preferred.

In the above copolymerization, a polymerization initiator, a surfactant, a chain-transfer agent, and a solvent may be used, each of which may be any conventionally known one. The polymerization initiator may be an oil-soluble radical polymerization initiator or a water-soluble radical polymerization initiator.

The oil-soluble radical polymerization initiator may be a known oil-soluble peroxide, and typical examples thereof include dialkyl peroxycarbonates such as diisopropyl peroxydicarbonate, di-n-propyl peroxydicarbonate, and di-sec-butyl peroxydicarbonate; peroxyesters such as t-butyl peroxyisobutyrate and t-butyl peroxypivalate; dialkyl peroxides such as di-t-butyl peroxide; and di(perfluoro (or fluorochloro) acyl)peroxides such as di(ω-hydro-dodecafluoroheptanoyl)peroxide, di(ω-hydro-tetradecafluoroheptanoyl) peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl) peroxide, di(tetrachloroundecafluorooctanoyl)peroxide, di(pentachlorotetradecafluorodecanoyl)peroxide, and di(undecachlorodotriacontafluorodocosanoyl)peroxide.

The water-soluble radical polymerization initiator may be a known water-soluble peroxide, and examples thereof include ammonium salts, potassium salts, sodium salts, t-butyl permaleates, and t-butyl hydroperoxides of persulfuric acid, perboric acid, perchloric acid, perphosphoric acid, and percarbonic acid. Any reducing agent such as a sulfite or a sulfurous acid salt may be used in combination with a peroxide, and the amount thereof may be 0.1 to 20 times the amount of the peroxide.

The surfactant may be a known surfactant, and examples thereof include nonionic surfactants, anionic surfactants, and cationic surfactants. Preferred are fluorine-containing anionic fluorosurfactants, and more preferred are C4-C20 linear or branched fluorine-containing anionic surfactants which may optionally contain an ether bond (i.e., an oxygen atom may be present between carbon atoms). The amount thereof (relative to the water as a polymerization medium) is preferably 50 to 5000 ppm.

Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is typically 0.01 to 20% by mass relative to the polymerization solvent.

Examples of the solvent include water and solvent mixtures of water and an alcohol.

In the suspension polymerization, a fluorosolvent may be used in addition to water. Examples of the fluorosolvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$; hydrofluorocarbons such as $CF_2HCF_2CF_2CF_2H$, $CF_3CFHCF_2CF_2CF_3$, $CF_3CF_2CF_2CF_2F_2H$, $CF_3CF_2CFHCF_2CF_3$, $CF_3CFHCFHCF_2CF_3$, $CF_2HCF_2CF_2CF_2CF_2H$, $CF_2HCFHCF_2CF_2CF_3$, $CF_3CF_2CF_2CF_2CF_2CF_2H$, $CF_3CH(CF_3)CF_3CF_2CF_3$, $CF_3CF(CF_3)CFHCF_2CF_3$, $CF_3CF(CF_3)CFHCFHCF_3$, $CF_3CH(CF_3)CFHCF_2CF_3$, $CF_2HCF_2CF_2CF_2CF_2CF_2H$, $CF_3CF_2CF_2CF_2CH_2CH_3$, and $CF_3CH_2CF_2CH_3$; (perfluoroalkyl)alkyl ethers such as $F(CF_2)_4OCH_3$, $F(CF_2)_4OC_2H_5$, $(CF_3)_2CFOCH_3$, and $F(CF_2)_3OCH_3$; and hydrofluoroalkyl ethers such as $CF_3CH_2OCF_2CHF_2$, $CHF_2CF_2CH_2OCF_2CHF_2$, and $CF_3CF_2CH_2OCF_2CHF_2$. Preferred are perfluoroalkanes. In order to achieve good suspension performance and economic efficiency, the amount of the fluorosolvent is preferably 10 to 100% by mass relative to the aqueous medium.

The polymerization temperature may be, but is not limited to, 0° C. to 100° C. The polymerization pressure is appropriately set in accordance with other polymerization conditions such as the type, amount, and vapor pressure of a solvent used, and the polymerization temperature. It may typically be 0 to 9.8 MPaG.

In the case of suspension polymerization using water as a dispersion medium, a suspension agent such as methyl cellulose, methoxylated methyl cellulose, propoxylated methyl cellulose, hydroxyethyl cellulose, hydroxypropyl cellulose, polyvinyl alcohol, polyethylene oxide, or gelatin may be used in an amount of 0.005 to 1.0% by mass, preferably 0.01 to 0.4% by mass, relative to the water.

Examples of the polymerization initiator to be used in this case include diisopropyl peroxydicarbonate, di-normal-propyl peroxydicarbonate, di-normal-heptafluoropropyl peroxydicarbonate, isobutyryl peroxide, di(chlorofluoroacyl) peroxide, and di(perfluoroacyl)peroxide. The amount thereof is preferably 0.1 to 5% by mass relative to the sum of the amounts of the monomers (the sum of the amounts of vinylidene fluoride, tetrafluoroethylene, the monomer (2-2), and optionally a different monomer(s) copolymerizable with these monomers).

Further, the polymerization degree of the polymer to be obtained can be controlled by adding a chain-transfer agent such as ethyl acetate, methyl acetate, acetone, ethanol, n-propanol, acetaldehyde, propylaldehyde, ethyl propionate, or carbon tetrachloride. The amount thereof is typically 0.1 to 5% by mass, preferably 0.5 to 3% by mass, relative to the sum of the amounts of the monomers.

The sum of the amounts of the monomers, expressed by the weight ratio of (sum of monomers):(water), satisfies 1:1 to 1:10, preferably 1:2 to 1:5. The polymerization is performed at a temperature of 10° C. to 50° C. for 10 to 100 hours.

The aforementioned suspension polymerization can easily copolymerize vinylidene fluoride, tetrafluoroethylene, the monomer (2-2), and optionally a different monomer(s).

The emulsion polymerization is performed in the presence of an aqueous medium. The aqueous medium is preferably water. The water used in the polymerization is preferably deionized water, and the electrical conductivity thereof is 10 µS/cm or lower and is preferably as low as possible. If there are many ions, the reaction rate may be unstable. Also, the fluorosolvent preferably contains minimum amounts of components such as compounds containing an acid or a chlorine group introduced during production. In other words, the fluorosolvent preferably has a purity as high as possible. Such compounds containing an acid or chlorine may chain transfer. Thus, to minimize the amounts of such compounds is preferred so as to stabilize the polymerization rate and the molecular weight. In addition, other materials to be used in the polymerization (e.g., monomers such as vinylidene fluoride and tetrafluoroethylene, initiator, chain-transfer agent) are also preferably those having high purity containing small amounts of chain-transfer components. In order to stabilize the reaction rate and to control the molecular weight, a preparatory stage for the reaction is preferably performed as follows. Specifically, a container is charged with water and subjected to an air-tight test under stirring, and then the pressure inside the container is reduced, slightly increased with nitrogen, and reduced repeatedly. The oxygen concentration in the container is then checked whether it is reduced to as low as 1000 ppm or lower, and again the pressure is reduced and materials such as the monomers are fed, so that the reaction is initiated.

In the emulsion polymerization, the polymerization temperature may be, but is not limited to, 0° C. to 150° C. The polymerization pressure is appropriately set in accordance with other polymerization conditions such as the polymerization temperature, and may typically be 0 to 9.8 MPaG.

In the emulsion polymerization, one or more surfactants may be used. The surfactant may be any known emulsifier, and examples thereof include the following surfactant groups (A) to (G).

(Surfactant Group (A))

Fluorine-containing anionic alkyl surfactants such as $CF_3(CF_2)_4COONH_4$, $CF_3(CF_2)_3COONH_4$, $CF_3(CF_2)_2COONH_4$, $CF_3(CF_2)_3SO_3Na$, and $CF_3(CF_2)_3SO_2NH_2$ (Surfactant Group (B))

Fluorine-containing anionic alkyl ether surfactants represented by the formula: $CF_3O-CF(CF_3)CF_2O-CX^a(CF_3)-Y^a$ (wherein $X^a$ is H or F; and $Y^a$ is $-COOM^1$, $-SO_3M^2$, $-SO_2NM^3M^4$, or $-PO_3M^5M^6$, where $M^1$, $M^2$, $M^3$, $M^4$, $M^5$, and $M^6$ are the same as or different from each other, and are each H, $NH_4$, or a monovalent cation); those represented by the formula: $CF_3O-CF_2CF_2CF_2O-CFX^a CF_2-Y^a$ (wherein $X^a$ is H or F; and $Y^a$ is defined as described above); and those represented by the formula: $CF_3CF_2O-CF_2CF_2O-CFX^a-Y^a$ (wherein $X^a$ is H or F; and $Y^a$ is defined as described above)

(Surfactant Group (C))

Fluorine-containing allyl ethers such as $CH_2=CFCF_2-O-(CF(CF_3)CF_2O)-CF(CF_3)-COONH_4$ (Surfactant Group (D))

Non-fluorinated surfactants, including alkanesulfonic acids such as linear 1-octanesulfonic acid, linear 2-octanesulfonic acid, linear 1,2-octanedisulfonic acid, linear 1-decanesulfonic acid, linear 2-decanesulfonic acid, linear 1,2-decanedisulfonic acid, linear 1,2-dodecanedisulfonic acid, linear 1-dodecanesulfonic acid, linear 2-dodecanesulfonic acid, and linear 1,2-dodecanedisulfonic acid, and salts thereof; alkyl sulfates such as 1-octyl sulfate, 2-octyl sulfate, 1,2-octyl disulfate, 1-decyl sulfate, 2-decyl sulfate, 1,2-decyl disulfate, 1-dodecyl sulfate, 2-dodecyl sulfate, and 1,2-dodecyl disulfate, and salts thereof; polyvinylphosphonic acid and salts thereof; polyacrylic acid and salts thereof; and polyvinylsulfonic acid and salts thereof (Surfactant Group (E))

Non-fluorine ether surfactants such as polyethylene glycol acrylate, polyethylene glycol, polyethylene glycol phenol oxide, polypropylene glycol acrylate, and polypropylene glycol (Surfactant Group (F))

Mixtures of at least one surfactant selected from the group consisting of non-fluorine surfactants (e.g., at least one selected from the surfactant group (D)) and fluorine-containing surfactants having a molecular weight of less than 400, and a functional fluoropolyether (a compound containing a fluoropolyoxyalkylene chain (e.g., a chain containing at least one repeating unit represented by the formula: —$(CF_2)_j$—$CFZ^eO$— (wherein $Z^e$ is F or a C1-C5 (per)fluoro(oxy)alkyl group; and j is an integer of 0 to 3)) and a functional group (e.g., at least one selected from the group consisting of a carboxylic acid group, a phosphonic acid group, a sulfonic acid group, and acid-salt-type groups thereof))

(Surfactant Group (G))

Inactivated non-fluorine surfactants (e.g., products obtained by reacting a hydrocarbon-containing surfactant such as sodium dodecylsulfate, linear sodium alkylpolyether sulfonate, or a siloxane surfactant with hydrogen peroxide or a polymerization initiator to be mentioned later)

The amount of the surfactant is preferably 1 to 50000 ppm of the aqueous medium.

The polymerization initiator for the emulsion polymerization may be an oil-soluble radical polymerization initiator or a water-soluble radical polymerization initiator, and is preferably a water-soluble radical polymerization initiator.

The oil-soluble radical polymerization initiator may be a known oil-soluble peroxide, and typical examples thereof include dialkyl peroxycarbonates such as diisopropyl peroxydicarbonate, di-n-propyl peroxydicarbonate, and di-sec-butyl peroxydicarbonate; peroxyesters such as t-butyl peroxyisobutyrate and t-butyl peroxypivalate; dialkyl peroxides such as di-t-butyl peroxide; and di(perfluoro (or fluorochloro) acyl)peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotriacontafluorodocosanoyl)peroxide.

The water-soluble radical polymerization initiator may be a known water-soluble peroxide, and examples thereof include ammonium salts, potassium salts, sodium salts, t-butyl permaleates, and t-butyl hydroperoxides of persulfuric acid, perboric acid, perchloric acid, perphosphoric acid, and percarbonic acid. Any reducing agent such as a sulfite or a sulfurous acid salt may be used in combination with a peroxide, and the amount thereof may be 0.1 to 20 times the amount of the peroxide.

The polymerization initiator for the emulsion polymerization is more preferably a persulfate. The amount thereof is 0.001 to 20% by mass relative to the aqueous medium.

In the emulsion polymerization, a chain-transfer agent may be used. Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is 0.001 to 20% by mass relative to the aqueous medium.

In the case of powdering the latex obtained by the emulsion polymerization, this powdering may be performed by a conventionally known method, although not limited thereto. Examples thereof include coagulation by adding acid, coagulation by adding inorganic metal salt, coagulation by adding organic solvent, and freezing coagulation. The coagulating agent for acid coagulation may be any known coagulating agent, such as hydrochloric acid, sulfuric acid, or nitric acid. The coagulating agent for salt coagulation may be any known coagulating agent, such as sodium sulfate, magnesium sulfate, or aluminum sulfate. The coagulation may be followed by washing with water or an organic solvent to remove residual components such as a surfactant, a polymerization initiator, a chain-transfer agent, and an excessive coagulating agent. The wet polymer is then dried, whereby dry powder is obtained.

The aforementioned emulsion polymerization can easily copolymerize vinylidene fluoride, tetrafluoroethylene, the monomer (2-2), and optionally a different monomer(s).

The amounts of monomers to be copolymerized with vinylidene fluoride and tetrafluoroethylene (i.e., the monomer (2-2) and an optional different monomer(s)) are decided in consideration of the properties of the resulting copolymer, such as the adhesiveness, chemical resistance, molecular weight, and polymerization yield.

The porous film may consist only of the fluorine-containing polymer, or may contain the fluorine-containing polymer and a different component. For the porous film containing the fluorine-containing polymer and a different component, the fluorine-containing polymer is preferably in an amount of 1 to 50% by mass in the porous film.

Too large an amount of the fluorine-containing polymer may cause too low a porosity of the porous film, resulting in a failure in achieving an ion permeating function of the separator. Too small an amount of the fluorine-containing polymer may cause a significant reduction in mechanical physical properties of the porous film.

The amount of the fluorine-containing polymer is more preferably 45% by mass or less, still more preferably 40% by mass or less, while more preferably 2% by mass or more, still more preferably 3% by mass or more, particularly preferably 4% by mass or more, in the porous film.

The porous film preferably contains at least one particulate inorganic substance selected from the group consisting of a particulate metal oxide and a particulate metal hydroxide. The porous film containing the particulate inorganic substance allows the separator to have excellent heat resistance (thermal stability).

The particulate inorganic substance is preferably in an amount of 50 to 99% by mass in the porous film. The particulate inorganic substance in an amount within the above range can lead to a separator that includes a porous film having a pore size and porosity that do not inhibit permeation of lithium ions. It can also lead to a separator having high heat resistance and low thermal shrinkage.

The amount of the particulate inorganic substance is more preferably 70% by mass or more, still more preferably 80% by mass or more, while more preferably 98% by mass or less, still more preferably 97% by mass or less, particularly preferably 96% by mass or less, in the porous film.

The particulate inorganic substance preferably has an average particle size of 25 μm or smaller, more preferably 10 μm or smaller, still more preferably 5 μm or smaller, particularly preferably 1 μm or smaller. The lower limit of the average particle size is preferably 0.02 μm.

The average particle size is a value obtainable by measurement using a transmission electron microscope, laser particle size distribution analyzer, or the like.

In order to improve the ion conductivity and shutdown effect of the separator, the particulate metal oxide is preferably an oxide of a metal other than alkali metals and alkaline earth metals, more preferably at least one selected from the group consisting of aluminum oxide, silicon oxide, titanium oxide, vanadium oxide, and copper oxide.

The particulate metal oxide preferably has an average particle size of 25 μm or smaller, more preferably 10 μm or smaller, still more preferably 5 μm or smaller, particularly preferably 1 μm or smaller. The lower limit of the average particle size is preferably 0.02 μm.

The average particle size is a value obtainable by measurement using a transmission electron microscope.

In order to achieve excellent ion conductivity, the particulate metal oxide is particularly preferably particulate aluminum oxide or particulate silicon oxide having an average particle size of 5 μm or smaller.

The particulate metal oxide is preferably in an amount of 50 to 99% by mass in the porous film. The particulate metal oxide in an amount within the above range can lead to a separator that includes a porous film having a pore size and porosity that do not inhibit permeation of lithium ions. It can also lead to a separator having high heat resistance and low thermal shrinkage.

The amount of the particulate metal oxide is more preferably 70% by mass or more, still more preferably 80% by mass or more, while more preferably 98% by mass or less, still more preferably 97% by mass or less, particularly preferably 96% by mass or less, in the porous film.

In order to improve the ion conductivity and shutdown effect of the separator, the particulate metal hydroxide is preferably a hydroxide of an alkali metal or an alkaline earth metal, more preferably at least one selected from the group consisting of magnesium hydroxide, calcium hydroxide, aluminum hydroxide, chromium hydroxide, zirconium hydroxide, and nickel hydroxide.

The particulate metal hydroxide preferably has an average particle size of 25 μm or smaller, more preferably 10 μm or smaller, still more preferably 5 μm or smaller, particularly preferably 1 μm or smaller. The lower limit of the average particle size is preferably 0.02 μm.

The average particle size is a value obtainable by measurement using a transmission electron microscope.

The particulate metal hydroxide is preferably in an amount of 50 to 99% by mass in the porous film. The particulate metal hydroxide in an amount within the above range can lead to a separator that includes a porous film having a pore size and porosity that do not inhibit permeation of lithium ions. It can also lead to a separator having high heat resistance and low thermal shrinkage.

The amount of the particulate metal hydroxide is more preferably 70% by mass or more, still more preferably 80% by mass or more, while more preferably 98% by mass or less, still more preferably 97% by mass or less, particularly preferably 96% by mass or less, in the porous film.

The porous film preferably further contains an particulate organic substance. The particulate organic substance is preferably a non-conductive crosslinked polymer, more preferably crosslinked polystyrene, crosslinked polymethacrylate, or crosslinked acrylate.

The particulate organic substance preferably has an average particle size of 25 μm or smaller, more preferably 10 μm or smaller, still more preferably 5 μm or smaller, particularly preferably 1 μm or smaller. The lower limit of the average particle size is preferably 0.02 μm.

The average particle size is a value obtainable by measurement using a transmission electron microscope.

The particulate organic substance is preferably in an amount of 0 to 49% by mass in the porous film. The particulate organic substance in an amount within the above range can lead to a separator that includes a porous film having a pore size and porosity that do not inhibit permeation of lithium ions.

The amount of the particulate organic substance is more preferably 2% by mass or more, still more preferably 5% by mass or more, while more preferably 37% by mass or less, still more preferably 35% by mass or less, in the porous film.

The porous film may further contain any component other than the fluorine-containing polymer, the particulate inorganic substance, and the particulate organic substance. Such a component may be a different resin or rubber.

Examples of a preferred resin to be used in combination include one or two or more of polyacrylate, polymethacrylate, polyacrylonitrile, polyamide-imide, polyvinylidene fluoride (PVdF), and VdF/HEP copolymerized resin.

Examples of a preferred rubber to be used in combination include one or two or more of VdF/HFP copolymerized rubber, VdF/TFE/HFP copolymerized rubber, and acrylic rubber. These rubbers may not be crosslinked.

Examples of a particularly preferred resin or rubber to be used in combination include acrylic rubber in order to achieve improved ion conductivity, and VdF/HFP copolymerized rubber, VdF/TFE/HFP copolymerized rubber, and VdF/HFP resin in order to achieve improved ion conductivity and improved oxidation resistance.

The VdF/HFP copolymerized rubber preferably has a VdF unit/HFP unit mole ratio of 80/20 to 65/35.

The VdF/TFE/HFP copolymerized rubber preferably has a VdF unit/HFP unit/TFE unit mole ratio of 80/5/15 to 60/30/10.

The VdF/HFP resin preferably has a VdF unit/HFP unit mole ratio of 98/2 to 85/15.

The VdF/HFP resin preferably has a melting point of 100° C. to 200° C.

The different resin or rubber is preferably in an amount of 400 parts by mass or less, more preferably 200 parts by mass or less, still more preferably 150 parts by mass or less, relative to 100 parts by mass of the fluorine-containing polymer. The lower limit may be about 10 parts by mass, although it varies in accordance with the target effect.

The porous film is disposed on or above the porous substrate. The porous film is preferably disposed directly on the porous substrate.

The porous film may be disposed on or above only one side of the porous substrate, or may be on or above both sides thereof. The porous film may be disposed to cover the entire surface of the porous substrate where the porous film is disposed, or may be disposed to cover only a part of the surface thereof.

When the porous film is disposed on or above only one side of the porous substrate, the porous film preferably has a weight of 0.5 to 50.0 g/m$^2$. A porous film having a weight of less than 0.5 g/m$^2$ may cause insufficient adhesiveness to the electrodes. A porous film having a weight of more than 50.0 g/m² is not preferred because it tends to inhibit ion conduction to cause poor load characteristics of a battery. When the porous film is disposed on or above both the front and back surfaces of the porous substrate, the weight of the porous film is preferably 0.1 to 6.0 g/m².

The porous film preferably has a thickness of 1 to 5 μm, more preferably 1 to 4 μm, still more preferably 1 to 3 μm. The porous film having a thickness within the above range can ensure film breaking strength and insulation and can prevent strong curl of the porous substrate.

The porous substrate means a substrate containing pores or voids inside. Examples of such a substrate include microporous films, porous sheets made of a fibrous material such as nonwoven fabric or sheet paper, and composite porous films including any of these microporous films and porous sheets and one or more different porous layers stacked thereon. The microporous film means a film including a large number of micropores inside which communicate with each other to allow passage of gas or liquid from one surface to the opposite surface.

The porous substrate may be formed from a material that is either an organic material or inorganic material having electric insulation. In order to give a shutdown function to the substrate, the material constituting the substrate is particularly preferably a thermoplastic resin. The shutdown function is a function such that, when the battery temperature increases, the thermoplastic resin is dissolved to block the pores of the porous substrate and cut off the movement of ions, thereby preventing thermal runaway of the battery. An appropriate thermoplastic resin is a thermoplastic resin having a melting point of lower than 200° C., and particularly preferred is a polyolefin.

The porous substrate containing a polyolefin is preferably a microporous polyolefin film. The microporous polyolefin film to be used is a microporous polyolefin film that has sufficient mechanical properties and ion permeability and that is applied to a conventional separator for a non-aqueous secondary battery. In order to achieve the aforementioned shutdown function, the microporous polyolefin film preferably contains polyethylene.

The polyolefin preferably has a weight average molecular weight of 100000 to 5000000. Polyolefin having a weight average molecular weight of less than 100000 may have difficulty in ensuring sufficient mechanical properties. Polyolefin having a weight average molecular weight of more than 5000000 may give poor shutdown performance or may cause a difficulty in molding.

Such a microporous polyolefin film can be produced by the following method, for example. Specifically, the microporous polyolefin film may be produced by a method successively including (i) extruding a molten polyolefin resin through a T-die to form a sheet, (ii) subjecting the sheet to a crystallization treatment, (iii) stretching the sheet, and (iv) subjecting the sheet to a heat treatment to form a microporous film. Alternatively, the microporous polyolefin film may be produced by a method successively including (i) melting a polyolefin resin together with a plasticizer such as a liquid paraffin, extruding the molten material through a T-die, and cooling the extrudate to form a sheet, (ii) stretching the sheet, (iii) extracting the plasticizer from the sheet, and (iv) subjecting the sheet to a heat treatment to form a microporous film.

The porous sheet formed from a fibrous material may be a porous sheet formed from a fibrous material of a heat-resistant polymer, including polyester such as polyethylene terephthalate, polyolefin such as polyethylene or polypropylene, aromatic polyamide, polyimide, polyethersulfone, polysulfone, polyether ketone, or polyetherimide, or a mixture of any of these fibrous materials.

The porous substrate may also be a composite porous substrate including a functional layer stacked therein.

The composite porous substrate is preferred in that the functional layer can give an additional function. In order to give heat resistance, for example, the functional layer may be a porous layer containing a heat-resistant resin or a porous layer containing a heat-resistant resin and inorganic filler. The heat-resistant resin may include one or two or more heat-resistant polymers selected from aromatic polyamide, polyimide, polyethersulfone, polysulfone, polyether ketone, and polyetherimide. The inorganic filler may preferably be a metal oxide such as alumina or a metal hydroxide such as magnesium hydroxide, for example. The compounding may be achieved by a method of coating a porous sheet with a functional layer, bonding the layers using adhesive, or thermocompression bonding, for example.

The porous substrate in the invention is preferably formed from at least one resin selected from the group consisting of polyethylene, polypropylene, polyimide, polyamide, polyethylene terephthalate, polyester, and polyacetal among those described above.

In order to achieve good mechanical properties and internal resistance, the porous substrate in the invention preferably has a thickness of 5 to 50 μm. The upper limit of the thickness is more preferably 40 μm, still more preferably 30 μm. The lower limit of the thickness is more preferably 10 μm.

The porous substrate preferably has a Gurley value of 500 sec/100 ccAir or lower, more preferably 300 sec/100 ccAir or lower. The Gurley value is preferably 50 sec/100 ccAir or higher.

The Gurley value is a value obtainable by measurement using a Gurley densometer in conformity with JIS P 8117.

The porous substrate preferably has a porosity of 30 to 70%, more preferably 35 to 60%.

The porosity is a value calculated by the following formula.

Porosity=[1−sample mass (g)/(sample density (g/cm³)×sample volume (cm³))]×100

The sample volume (cm³) herein is calculated by 10 cm×10 cm×thickness (cm).

The porous substrate preferably has an average pore size of 0.01 to 0.5 μm, more preferably 0.1 to 0.3 μm.

The average pore size is determined as follows. First, the specific surface area (m²/g) of the porous substrate is measured by the gas absorption method based on the BET formula, and multiplied by the weight per unit area (g/m²) of the porous substrate. Thereby, the pore surface area S per square meter of the porous substrate is calculated. Separately, the pore volume V per square meter of the porous substrate is calculated based on the porosity. Using the resulting values, the average pore size (diameter) d is calculated by the following formula.

$d=4\cdot V/S$

The porous substrate having a Gurley value, porosity, and average pore size within the above respective ranges can lead to a separator having excellent ion permeability, which can result in a battery having good charge and discharge characteristics.

The separator of the invention may be produced by stacking the porous film on or above the porous substrate. The stacking may be performed by a conventionally known method, although not limited thereto. Specifically preferred is a method in which a solution or dispersion is prepared by dissolving or dispersing the fluorine-containing polymer and optionally other components in a solvent or water and the solution or dispersion is applied to the porous substrate by roll-coating; a method in which the porous substrate is dipped into the solution or dispersion; or a method in which the solution or dispersion is applied to the porous substrate and the workpiece is immersed into an appropriate solidification liquid, for example. Alternatively, a film may be formed from the porous film in advance and this film and the porous substrate may be stacked by, for example, a laminating technique. The film formed from the porous film may be produced by a method in which a solution or dispersion is prepared by dissolving or dispersing the fluorine-containing polymer and optionally other components in a solvent, the solution or dispersion is cast on a film having a smooth surface such as a polyester film or an aluminum film, and then the resulting film is peeled.

Examples of the solvent include amide-based solvents such as N-methyl-2-pyrrolidone; ketone-based solvents such as acetone; and cyclic ether-based solvents such as tetrahydrofuran. The fluorine-containing polymer and other components optionally blended as needed may be dispersed in water for use.

A water-based solution or dispersion containing the fluorine-containing polymer may be prepared by blending a thickening agent (stabilizer) for viscosity control into an aqueous dispersion of the fluorine-containing polymer obtained by emulsion polymerization, for example.

Examples of the thickening agent (stabilizer) include a carboxyalkyl cellulose, an alkyl cellulose, and a hydroxyalkyl cellulose.

Preferably, the resulting solution or dispersion is applied to the porous substrate and dried, whereby the porous film is formed.

A solvent-based solution or dispersion containing the fluorine-containing polymer may be prepared by agglomerating the fluorine-containing polymer in an aqueous dispersion obtained by emulsion polymerization, for example, and drying the agglomerates to prepare powder of the fluorine-containing polymer and then blending the powder with a solvent.

Preferably, the resulting solution or dispersion is applied to the porous substrate and dried, whereby the porous film is formed.

The separator of the invention preferably has a Gurley value of 500 sec/100 ccAir or lower, more preferably 300 sec/100 ccAir or lower. The Gurley value is preferably 50 sec/100 ccAir or higher.

The Gurley value is a value obtainable by measurement using a Gurley densometer in conformity with JIS P 8117.

The separator of the invention preferably has a Gurley value increase of 140% or lower, more preferably 130% or lower, still more preferably 120% or lower. The Gurley value increase is preferably 103% or higher.

The Gurley value increase can be calculated by the following formula.

Gurley value increase (%)=(Gurley value of combined porous film (separator) including porous film on or above porous substrate/Gurley value of porous substrate alone)×100

The secondary battery separator of the invention can constitute a secondary battery together with a positive electrode, a negative electrode, and a non-aqueous electrolyte solution. As described above, the secondary battery separator of the invention includes the porous substrate and the porous film firmly bonded to each other and has excellent low-temperature processability and electrolyte solution resistance. Thus, a secondary battery including the secondary battery separator of the invention has excellent high-temperature cycle performance.

The invention also relates to a secondary battery including the separator, a positive electrode, a negative electrode, and a non-aqueous electrolyte solution. The secondary battery of the invention has excellent high-temperature cycle performance.

The positive electrode, the negative electrode, and the non-aqueous electrolyte solution may be known ones that can be used for a secondary battery.

The secondary battery is particularly preferably a lithium secondary battery. The following describes a typical structure of the secondary battery of the invention in the case of a lithium secondary battery. Still, the secondary battery of the invention is not limited to the following structure.

The positive electrode includes a current collector and a positive electrode mixture containing a positive electrode active material that is a material of the positive electrode.

The positive electrode active material may be any one that can electrochemically occlude and release lithium ions. The positive electrode active material is preferably a substance containing lithium and at least one transition metal, and examples thereof include lithium-transition metal complex oxides such as lithium-cobalt complex oxides, lithium-nickel complex oxides, and lithium-manganese complex oxides, and lithium-containing transition metal-phosphoric acid compounds.

The positive electrode mixture preferably further contains a binder, a thickening agent, and a conductive material.

The binder may be any material that is safe against a solvent used in production of the electrode and an electrolyte solution. Examples thereof include polyvinylidene fluoride, polytetrafluoroethylene, vinylidene fluoride-tetrafluoroethylene copolymers, vinylidene fluoride-hexafluoropropylene copolymers, vinylidene fluoride-tetrafluoroethylene-hexafluoropropylene copolymers, polyethylene, polypropylene, styrene-butadiene rubber, isoprene rubber, butadiene rubber, ethylene-acrylic acid copolymers, and ethylene-methacrylic acid copolymers.

Examples of the thickening agent include carboxymethyl cellulose, methyl cellulose, hydroxymethyl cellulose, ethyl cellulose, polyvinyl alcohol, oxidized starch, phosphorylated starch, and casein.

Examples of the conductive material for the positive electrode include carbon materials such as graphite and carbon black.

The current collector for the positive electrode may be formed from a metal such as aluminum, titanium, or tantalum, or an alloy thereof, for example. Preferred is aluminum or an alloy thereof.

The positive electrode may be produced by a common method. An example of the method is a method in which the positive electrode active material is mixed with components such as the aforementioned binder, thickening agent, and conductive material, and a solvent to provide a positive electrode mixture in the form of slurry, this slurry is applied to a current collector and dried, and then the workpiece is pressed for densification.

The negative electrode includes a current collector and a negative electrode mixture containing a negative electrode material.

Examples of the negative electrode material include pyrolysates of organic matter under various pyrolysis conditions, carbonaceous materials capable of occluding and releasing lithium, such as artificial graphite and natural graphite;

metal oxide materials capable of occluding and releasing lithium, such as tin oxide and silicon oxide; lithium metals; and a variety of lithium alloys. Two or more of these negative electrode materials may be used in combination.

Examples of preferred carbonaceous materials capable of occluding and releasing lithium include artificial graphite or purified natural graphite produced by a high-temperature treatment on easily graphitizable pitch obtained from a variety of materials, and those obtained by a surface treatment on such graphite with pitch or other organic matter and carbonization of the resulting surface-treated material.

The negative electrode mixture preferably further contains a binder, a thickening agent, and a conductive material.

Examples of the binder include the same binders as those to be used for the positive electrode mentioned above.

Examples of the thickening agent include the same thickening agents as those to be used for the positive electrode mentioned above.

Examples of the conductive material for the negative electrode include metal materials such as copper and nickel; and carbon materials such as graphite and carbon black.

The current collector for the negative electrode may be formed from copper, nickel, or stainless steel, for example. In order to make a thin film easily and to reduce the cost, copper is preferred.

The negative electrode may be produced by a common method. An example of the method is a method in which the negative electrode material is mixed with components such as the aforementioned binder, thickening agent, and conductive material, and a solvent to provide slurry, this slurry is applied to a current collector and dried, and then the workpiece is pressed for densification.

The non-aqueous electrolyte solution used may be one containing a known electrolyte salt dissolved in a known organic solvent for electrolyte salt dissolution.

The organic solvent for electrolyte salt dissolution may include, but is not limited to, one or two or more selected from hydrocarbon solvents such as propylene carbonate, ethylene carbonate, butylene carbonate, γ-butyrolactone, 1,2-dimethoxyethane, 1,2-diethoxyethane, dimethyl carbonate, diethyl carbonate, ethyl methyl carbonate, and vinylene carbonate; and fluorine-based solvents such as fluoroethylene carbonate, fluoroether, and fluorinated carbonate.

Examples of the electrolyte salt include $LiClO_4$, $LiAsF_6$, $LiBF_4$, $LiPF_6$, $LiCl$, $LiBr$, $CH_3SO_3Li$, $CF_3SO_3Li$, $LiN(SO_2CF_3)_2$, $LiN(SO_2C_2F_5)_2$, and caesium carbonate. In order to achieve good cycle performance, particularly preferred is $LiPF_6$, $LiBF_4$, $LiN(SO_2CF_3)_2$, $LiN(SO_2C_2F_5)_2$, or a combination of any of these.

The electrolyte salt is preferably present in a concentration of 0.8 mol/L or higher, more preferably 1.0 mol/L or higher. The upper limit thereof is usually 1.5 mol/L although it varies in accordance with the organic solvent for electrolyte salt dissolution.

The lithium secondary battery may have any shape, such as a cylindrical shape, a square shape, a laminate shape, a coin shape, or a large-size shape. The shapes and structures of the positive electrode, the negative electrode, and the separator may be changed in accordance with the shape of the battery within the range that does not impair the effects of the invention.

EXAMPLES

The invention will be described below referring to, but is not limited to, examples. The physical properties of the fluorine-containing polymers in the examples were determined by the following methods.

<Polymer Composition>

The proportions of vinylidene fluoride (VdF) and tetrafluoroethylene (TFE) ($X1_{VdF}$ and $X_{TFE}$) (mol %) and the proportions of VdF and hexafluoropropylene (HFP) ($X2_{VdF}$ and $X_{HFP}$) (mol %) were determined by $^{19}$F-NMR measurement using an NMR analyzer (VNS400 MHz, available from Agilent Technologies Inc.) with the polymer in a DMF-$d_7$ solution state.

The proportions of 3-butenoic acid, 4-pentenoic acid, and carboxyethyl acrylate (CEA) were determined by acid-base titration of carboxy groups. The procedure thereof is described in detail below.

About 0.5 g of a fluorine-containing polymer was dissolved in 15 g of acetone at 70° C. to 80° C. Then, 5 ml of water was added such that the polymer was not solidified. The mixture was subjected to titration with 0.1 N aqueous NaOH in neutral transition at about −270 mV until the acidity reached a completely neutral value. Based on the measurement results, the amount α (mol/g) of 3-butenoic acid, 4-pentenoic acid, or CEA contained in 1 g of the fluorine-containing polymer was determined. Based on the amount α, the VdF/TFE composition or VdF/HFP composition of the fluorine-containing polymer determined by the above method, and the molecular weights of TFE, VdF, and 3-butenoic acid, 4-pentenoic acid, or CEA, the proportion Y (mol %) of 3-butenoic acid, 4-pentenoic acid, or CEA in the fluorine-containing polymer was determined so as to satisfy the following formula. Based on the resulting values $X1_{VdF}$, $X_{TFE}$, and Y or the resulting values $X2_{VdF}$, $X_{HFP}$, and Y, the final compositional ratio was calculated as follows. (Compositional ratio of VdF/TFE/3-butenoic acid or 4-pentenoic acid)

$$\alpha = Y/[\{\text{molecular weight of TFE}\} \times \{X_{TFE} \times (100-Y)/100\} + \{\text{molecular weight of VdF}\} \times \{X1_{VdF} \times (100-Y)/100\} + \{\text{molecular weight of 3-butenoic acid or 4-pentenoic acid}\} \times Y]$$

Proportion of VdF: $X1_{VdF} \times (100-Y)/100$ (mol %)
Proportion of TFE: $X_{TFE} \times (100-Y)/100$ (mol %)
Proportion of 3-butenoic acid or 4-pentenoic acid: Y (mol %)

$$\alpha = Y/[\{\text{molecular weight of HFP}\} \times \{X_{HFP} \times (100-Y)/100\} + \{\text{molecular weight of VdF}\} \times \{X2_{VdF} \times (100-Y)/100\} + \{\text{molecular weight of CEA}\} \times Y]$$
(Compositional ratio of VdF/HFP/CEA)

Proportion of VdF: $X2_{VdF} \times (100-Y)/100$ (mol %)
Proportion of HFP: $X_{HFP} \times (100-Y)/100$ (mol %)
Proportion of CEA: Y (mol %)

<Weight Average Molecular Weight>

The weight average molecular weight was determined by gel permeation chromatography (GPC). The weight average molecular weight was calculated from the data (reference: polystyrene) obtained by flowing dimethyl formamide (DMF) serving as a solvent at a flow rate of 1.0 ml/min using AS-8010, CO-8020, and columns (three pieces of GMHHR-H connected in series) available from Tosoh Corp. and RID-10A available from Shimadzu Corp.

<Preparation of Fluorine-Containing Polymer Solution>

The fluorine-containing polymer was weighed and dissolved in N-methyl-2-pyrrolidone (NMP) such that the concentration was 5% by mass, whereby a fluorine-containing polymer solution was obtained.

<Formation of Film and Evaluation of Elongation at Break>

The fluorine-containing polymer solution obtained above was cast on a glass plate and dried at 100° C. for five hours. Thereby, a film having a thickness of about 30 μm was obtained.

Each film was punched into a dumbbell shape in conformity with ASTM D1708, and the elongation at break was measured using an autograph at 25° C.

<Formation of Film and Evaluation of Storage Modulus>

The fluorine-containing polymer solution obtained above was cast on a glass plate and dried at 100° C. for 12 hours, then dried in vacuo at 100° C. for 12 hours. Thereby, a film having a thickness of about 40 μm was obtained. Each film was cut to have a length of 30 mm and a width of 5 mm, whereby a sample was prepared. For the sample having a size of 30 mm in length, 5 mm in width, and 40 μm in thickness, the storage modulus was determined at 25° C. or at 100° C. using a dynamic mechanical analyzer DVA220 available from IT Keisoku Seigyo K.K. in a tensile mode at a grip width of 20 mm, a measurement temperature of −30° C. to 160° C., a temperature-increasing rate of 2° C./min, and a frequency of 1 Hz.

Polymerization Example 1 (Production of Fluorine-Containing Polymer A)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put thereinto and the temperature inside the system was maintained at 37° C. A gas mixture of TFE/VdF=18/82 (mole ratio) was put into the autoclave, so that the pressure inside the container was adjusted to 1.5 MPa. Then, 0.69 g of 3-butenoic acid and 1.6 g of a 50% by mass methanol solution of di-n-propyl peroxydicarbonate were added, whereby the polymerization was initiated. A gas mixture of TFE/VdF=33/67 (mole ratio) was fed so as to maintain the pressure inside the container, with 70 g of the gas mixture added before the completion of the reaction. Simultaneously with the gas mixture feeding, 3-butenoic acid was continuously added, with 0.56 g thereof added before the completion of the reaction. Completion of feeding 70 g gas mixture was followed by release of the gas inside the container, whereby the reaction was completed.

The reaction product was washed with water and dried, whereby 67 g of a fluorine-containing polymer A was obtained.

The composition and physical properties of the resulting fluorine-containing polymer A are shown in Table 1.

Polymerization Example 2 (Production of Fluorine-Containing Polymer B)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put thereinto and the temperature inside the system was maintained at 37° C. A gas mixture of TFE/VdF=17/83 (mole ratio) was put into the autoclave, so that the pressure inside the container was adjusted to 1.5 MPa. Then, 0.92 g of 3-butenoic acid and 1.4 g of a 50% by mass methanol solution of di-n-propyl peroxydicarbonate were added, whereby the polymerization was initiated. A gas mixture of TFE/VdF=32/68 (mole ratio) was fed so as to maintain the pressure inside the container, with 70 g of the gas mixture added before the completion of the reaction. Simultaneously with the gas mixture feeding, 3-butenoic acid was continuously added, with 0.73 g thereof added before the completion of the reaction. Completion of feeding 70 g gas mixture was followed by release of the gas inside the container, whereby the reaction was completed.

The reaction product was washed with water and dried, whereby 66 g of a fluorine-containing polymer B was obtained.

The composition and physical properties of the resulting fluorine-containing polymer B are shown in Table 1.

Polymerization Example 3 (Production of Fluorine-Containing Polymer C)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put thereinto and the temperature inside the system was maintained at 37° C. A gas mixture of TFE/VdF=18/82 (mole ratio) was put into the autoclave, so that the pressure inside the container was adjusted to 1.5 MPa. Then, 0.56 g of 4-pentenoic acid and 2.2 g of a 50% by mass methanol solution of di-n-propyl peroxydicarbonate were added, whereby the polymerization was initiated. A gas mixture of TFE/VdF=33/67 (mole ratio) was fed so as to maintain the pressure inside the container, with 70 g of the gas mixture added before the completion of the reaction. Simultaneously with the gas mixture feeding, 4-pentenoic acid was continuously added, with 0.65 g thereof added before the completion of the reaction. Completion of feeding 70 g gas mixture was followed by release of the gas inside the container, whereby the reaction was completed.

The reaction product was washed with water and dried, whereby 66 g of a fluorine-containing polymer C was obtained.

The composition and physical properties of the resulting fluorine-containing polymer C are shown in Table 1.

Polymerization Example 4 (Production of Fluorine-Containing Polymer D)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put thereinto and the temperature inside the system was maintained at 37° C. A gas mixture of TFE/VdF=17/83 (mole ratio) was put into the autoclave, so that the pressure inside the container was adjusted to 1.5 MPa. Then, 0.74 g of 4-pentenoic acid and 1.0 g of a 50% by mass methanol solution of di-n-propyl peroxydicarbonate were added, whereby the polymerization was initiated. A gas mixture of TFE/VdF=32/68 (mole ratio) was fed so as to maintain the pressure inside the container, with 70 g of the gas mixture added before the completion of the reaction. Simultaneously with the gas mixture feeding, 4-pentenoic acid was continuously added, with 0.84 g thereof added before the completion of the reaction. Completion of feeding 70 g gas mixture was followed by release of the gas inside the container, whereby the reaction was completed.

The reaction product was washed with water and dried, whereby 66 g of a fluorine-containing polymer D was obtained.

The composition and physical properties of the resulting fluorine-containing polymer D are shown in Table 1.

Polymerization Example 5 (Production of Fluorine-Containing Polymer E)

A 4-L autoclave provided with a stirrer was charged with 1.4 kg of deionized water and purged with nitrogen.

Then, 1.2 kg of octafluorocyclobutane was put thereinto and the temperature inside the system was maintained at 37°

C. A monomer mixture of VdF/HFP=84/16 mol % was put into the autoclave until the pressure inside the system reached 1.8 MPaG. Then, 1.5 g of a 50% by mass methanol solution of di-n-propyl peroxydicarbonate was added, whereby the polymerization was initiated. As the polymerization proceeded, the pressure inside the system decreased. Thus, 140 g of a monomer mixture of VdF/HFP=93.6/6.4 mol % was continuously fed so as to maintain the pressure inside the system at 1.8 MPa before the completion of the polymerization. Then, the pressure was released to the atmospheric pressure and the resulting reaction product was washed with water and dried. Thereby, 135 g of a fluorine-containing polymer E was obtained.

The composition and physical properties of the resulting fluorine-containing polymer E are shown in Table 1.

Polymerization Example 6 (Production of Fluorine-Containing Polymer F)

A 3-L autoclave provided with a stirrer was charged with an emulsifier $F(CF_2)_5COONH_4$ and 1480 g of pure water such that the concentration of the emulsifier was to be 1.0% by mass, and sufficiently purged with nitrogen. Then, the temperature inside the system was maintained at 70° C. A gas mixture of TFE/VdF=33/67 (mole ratio) was put into the autoclave, so that the pressure inside the container was adjusted to 0.8 MPa. Then, 0.19 g of isopropyl alcohol and 0.15 g of ammonium persulfate were added, whereby the polymerization was initiated. A gas mixture of TFE/VdF=31/69 (mole ratio) was fed so as to maintain the pressure inside the container, with 420 g of the gas mixture added before the completion of the reaction. After the initiation of the reaction and before the completion of the reaction, 0.15 g in total of ammonium persulfate was added into the system. Completion of feeding 420 g gas mixture was followed by release of the gas inside the container, whereby the reaction was completed.

The inside of the container was cooled, whereby an aqueous dispersion having a polymer solid content of 20.1% by mass was obtained. The resulting dispersion was mixed with 8 g of a 28% by mass aluminum sulfate aqueous solution, and the slurry was collected by filtration. The collected slurry was washed with 2 L of pure water and dried, whereby 400 g of a fluorine-containing polymer F was obtained.

The composition and physical properties of the resulting fluorine-containing polymer F are shown in Table 1.

Polymerization Example 7 (Production of Fluorine-Containing Polymer G)

A 4-L autoclave provided with a stirrer was charged with 1.4 kg of deionized water and purged with nitrogen. Then, 1.2 kg of octafluorocyclobutane was put thereinto and the temperature inside the system was maintained at 37° C. Then, 0.9 g of 2-carboxyethyl acrylate (CEA) was put thereinto and a monomer mixture of VdF/HFP=83/17 mol % was put into the autoclave until the pressure inside the system reached 1.8 MPaG. Then, 1.5 g of a 50% by mass methanol solution of di-n-propyl peroxydicarbonate was added, whereby the polymerization was initiated. As the polymerization proceeded, the pressure inside the system decreased. Thus, 140 g of a gas mixture of VdF/HFP=94.5/ 5.5 mol % was continuously fed so as to maintain the pressure inside the system at 1.8 MPa before the completion of the polymerization. Simultaneously with the gas mixture feeding, 1.4 g of 2-carboxyethyl acrylate was continuously fed before the completion of the polymerization. Then, the pressure was released to the atmospheric pressure, and the resulting reaction product was washed with water and dried. Thereby, 137 g of a PVDF copolymer (fluorine-containing polymer G) in the form of white powder was obtained.

The composition and physical properties of the resulting fluorine-containing polymer G are shown in Table 1.

Polymerization Example 8 (Production of Fluorine-Containing Polymer H)

A 1.8-L autoclave provided with a stirrer was charged with 0.6 kg of pure water and 0.25 g of methyl cellulose and sufficiently purged with nitrogen. Then, 430 g of VdF was put thereinto and the temperature inside the system was maintained at 25° C. Then, 5.3 g of acetone and 1 g of a 50% by mass methanol solution of di-n-propyl peroxydicarbonate were added, whereby the polymerization was initiated. The polymerization was allowed to proceed for 15 hours while the temperature inside the container was maintained at 25° C. Then, the gas inside the container was released, whereby the reaction was completed.

The reaction product was washed with water and dried, whereby 198 g of a fluorine-containing polymer H was obtained.

The composition and physical properties of the resulting fluorine-containing polymer H are shown in Table 1.

Examples and Comparative Examples

<Production of Separator>

An N-methylpyrrolidone solution (5% by mass) of the fluorine-containing polymer obtained above, alumina powder (average particle size: 0.5 µm), and N-methylpyrrolidone in amounts of 39.6 parts by mass, 20 parts by mass, and 40.4 parts by mass, respectively, were put into a container and glass beads having a diameter of 0.5 mm were added thereto. The components were mixed using a paint shaker at 25° C. for 12 hours, and then the glass beads were filtered off. Thereby, a slurry-like coating liquid (slurry for composite porous film) containing alumina dispersed in the solvent was obtained. The slurry-like coating liquid obtained as described above was applied to a polyolefin porous substrate (polyethylene porous film, thickness: 15 µm, porosity: 40%, average pore size: 0.15 µm, Gurley value: 300 sec/100 ccAir) by blade coating. Then, the workpiece was placed in a humidity-controlled environment at a temperature of 22° C. and a relative humidity of 50% for one minute and immersed in an aqueous solution containing 4.5% by mass of N-methylpyrrolidone for 20 seconds, whereby a porous film was obtained. The porous film taken out was washed with water and then left in a 70° C. oven for two hours for drying. Thereby, a separator was obtained in which the fluorine-containing polymer/alumina composite porous film having a thickness as shown in Table 1 was present on the polyolefin porous film.

<Positive Electrode>

A positive electrode active material (NMC(532) ($LiNi_{0.5}Mn_{0.3}Co_{0.2}O_2$)), acetylene black (AB) serving as a conductive agent, and a binder (PVDF homopolymer KF7200, available from Kureha Corp.) were mixed at a mass ratio of 96/2/2 to give a positive electrode mixture. This positive electrode mixture in an amount of 25 mg/cm² was applied to one surface of aluminum foil having a thickness of 20 μm so as to give an electrode density of 3.4 g/cc, whereby a positive electrode for use was produced.
<Negative Electrode>
Artificial graphite, a binder (styrene-butadiene rubber), and a thickening agent (carboxymethyl cellulose) were mixed at a mass ratio of 97/1.5/1.5 to give a negative electrode mixture. This negative electrode mixture in an amount of 12 mg/cm² was applied to one surface of copper foil having a thickness of 18 μm so as to give an electrode density of 1.5 g/cc, whereby a negative electrode for use was produced.
<Secondary Battery>
The separator (cut to have a size of 7.7 cm×4.6 cm), the positive electrode (cut to have a size of 7.2 cm×4.1 cm), and the negative electrode (cut to have a size of 7.3 cm×4.2 cm) produced above were combined in the order of the positive electrode, the separator, and the negative electrode. They are collectively laminated with aluminum films and the laminated cell was pressed using a press machine at a roll temperature of 90° C. and a pressure of 3 MPa. Thereby, a battery was produced. In this step, the separator was placed such that the surface on the porous film side was in contact with the positive electrode.

Then, the laminated battery was dried at a 70° C. vacuum dryer for 12 hours or longer and an electrolyte solution was put thereinto such that the air was not left therein. The laminated battery was then sealed, whereby a full-cell lithium ion secondary battery was produced. The electrolyte solution used was one prepared by dissolving $LiPF_6$ in a solvent mixture of ethylene carbonate (EC) and ethyl methyl carbonate (EMC) (EC:EMC=7:3, volume ratio) such that the concentration was 1 mol/L and then adding 1% by mass vinylene carbonate (VC) thereto. $LiPF_6$, EC, EMC, and VC used were battery grade products available from Kishida Chemical Co., Ltd.

The fluorine-containing polymers used in the examples and comparative examples and the resulting separators and secondary batteries were evaluated as follows. Table 1 shows the results.
<Evaluation of Swellability in Electrolyte Solution of Fluorine-Containing Polymer>
An NMP solution (8% by mass) of the fluorine-containing polymer was cast on a glass Petri dish and vacuum dried at 100° C. for six hours. Thereby, a 200-μm-thick film of the fluorine-containing polymer was produced. The resulting film was cut to have a diameter of 10 mm. The piece was put into a sample bottle that contains an electrolyte solution (a solution of 1 M $LiPF_6$ dissolved in a solvent mixture of ethylene carbonate and ethyl methyl carbonate in a volume ratio of 3/7) and left at 60° C. for one week. Then, the weight increase was calculated by the following formula, whereby the swellability in electrolyte solution was evaluated.

Weight increase (%)=(weight of film after immersion in electrolyte solution/weight of film before immersion in electrolyte solution)×100

<Evaluation of Peel Strength Between Porous Substrate and Porous Film>
Evaluation of Peel Strength Before Immersion in Electrolyte Solution Only the separator including the porous film was sandwiched between aluminum films and pressed using a press machine at a roll temperature of 90° C. and a pressure of 3 MPa. Then, the separator was taken out and an adhesive tape (available from 3M Co.) was stuck to the surface provided with the porous film. The workpiece was cut to have a width of 20 mm and a length of 150 mm, whereby a test piece for peel strength was prepared. Next, the peel strength test was performed by the peel test using a tensile tester TENSILON at 23° C. and 50% RH. Thereby, the force (peel strength) required to peel off the tape was measured. The resulting force value was converted into a value corresponding to a width of 1 cm, which was taken as the peel strength (N/cm). The peel strength was evaluated by the following criteria.
    Good: The peel strength is not lower than 1.5 N/cm.
    Acceptable: The peel strength is not lower than 1.0 N/cm but lower than 1.5 N/cm.
    Poor: The peel strength is lower than 1.0 N/cm.
Evaluation of Peel Strength after Immersion in Electrolyte solution Then, the separator obtained as described above was put into a container that contains an electrolyte solution (a solution of 1 M $LiPF_6$ dissolved in a solvent mixture of ethylene carbonate and ethyl methyl carbonate in a volume ratio of 3/7) for immersion at 60° C. for one week. The separator was then taken out and subjected to the peel test as described above.
<Gurley Value Increase of Separator>
The Gurley value increase was determined using a Gurley densometer in conformity with JIS P 8117.

The Gurley value increase was calculated by the following formula.

Gurley value increase (%)=(Gurley value of combined porous film (separator) including porous film on or above porous substrate/Gurley value of porous substrate alone)×100

<Evaluation of 60° C. Cycle Performance of Secondary Battery>

The lithium ion secondary battery placed in a 60° C. constant temperature bath was subjected to 500 cycles of constant-current constant-voltage charge at 1 C to 0.05 C Rate and constant-current discharge at 1 C Rate in an alternate manner within the voltage range of 4.35 V to 3.0 V. The discharge capacities of five cells were measured and the average thereof was taken as the measured value. Then, based on the ratio of the discharge capacity at the 500th cycle to the discharge capacity at the 1st cycle (discharge capacity at 500th cycle/discharge capacity at 1st cycle (%)), the high-temperature cycle performance was evaluated.

TABLE 1

|  |  | Example 1 | Example 2 | Example 3 | Example 4 |
|---|---|---|---|---|---|
| Fluorine-containing polymer | Fluorine-containing polymer | A | B | C | D |
|  | Functional group monomer (α) | 3-Butenoic acid | 3-Butenoic acid | 4-Pentenoic acid | 4-Pentenoic acid |
|  | Polymer structure | VDF/TFE/α | VDF/TFE/α | VDF/TFE/α | VDF/TFE/α |
|  | Polymer composition (mol %) | 66.8/325/0.7 | 68.2/30.9/0.9 | 67.0/32.3/0.7 | 68.1/31.0/0.9 |
|  | Weight average molecular weight | 1160000 | 910000 | 930000 | 1100000 |
|  | Melting point (2nd peak) (° C.) | 134 | 127 | 133 | 127 |
|  | Storage modulus (MPa) (25° C.) | 471 | 473 | 453 | 460 |
|  | Storage modulus (MPa) (100° C.) | 61 | 58 | 59 | 52 |

TABLE 1-continued

| | | | | | |
|---|---|---|---|---|---|
| | Elongation at break (%) | 372 | 369 | 358 | 360 |
| | Thickness of porous film (μm) | 2 | 2 | 2 | 2 |
| | Peel strength between porous substrate and porous film (before immersion in electrolyte solution) (N/cm) | Good | Good | Good | Good |
| | Peel strength between porous substrate and porous film (after immersion in electrolyte solution) (N/cm) | Good | Good | Good | Good |
| Swellability in electrolyte solution (1M LiPF6 EC/EMC = 30/70 (vol %)) | Weight increase at 80° C. × 1 week (wt %) | 133 | 138 | 136 | 139 |
| Gurley value increase (%) | | 112 | 110 | 109 | 110 |
| 60° C. cycle performance | Capacity retension after 500 cycles (%) | 85 | 84 | 85 | 82 |

| | | Comparative Example 1 | Comparative Example 2 | Comparative Example 3 | Comparative Example 4 |
|---|---|---|---|---|---|
| Fluorine-containing polymer | Fluorine-containing polymer | E | F | G | H |
| | Functional group monomer (α) | None | None | CEA | None |
| | Polymer structure | VDF/HFP | VDF/TFE | VDF/HFP/α | VDF |
| | Polymer composition (mol %) | 93.8/6.2 | 68.2/31.8 | 94.1/5.2/0.7 | 100 |
| | Weight average molecular weight | 910000 | 1180000 | 910000 | 1040000 |
| | Melting point (2nd peak) (° C.) | 135 | 141 | 127 | 173 |
| | Storage modulus (MPa) (25° C.) | 360 | 530 | 410 | 1820 |
| | Storage modulus (MPa) (100° C.) | 22 | 77 | 32 | 524 |
| | Elongation at break (%) | 420 | 410 | 380 | 12 |
| | Thickness of porous film (μm) | 2 | 2 | 2 | 2 |
| | Peel strength between porous substrate and porous film (before immersion in electrolyte solution) (N/cm) | Acceptable | Acceptable | Good | Acceptable |
| | Peel strength between porous substrate and porous film (after immersion in electrolyte solution) (N/cm) | Poor | Poor | Poor | Poor |
| Swellability in electrolute solution (1M LiPF6 EC/EMC = 30/70 (vol %)) | Weight increase at 80° C. × 1 week (wt %) | 200 | 129 | 212 | 122 |
| Gurley value increase (%) | | 170 | 153 | 162 | 149 |
| 60° C. cycle performance | Capacity retension after 500 cycles (%) | 86 | 67 | 71 | 67 |

INDUSTRIAL APPLICABILITY

The secondary battery separator of the invention includes a porous substrate and a porous film firmly bonded to each other and has excellent low-temperature processability and electrolyte solution resistance. Thus, the separator can lead to a secondary battery having excellent high-temperature cycle performance.

The invention claimed is:

1. A secondary battery separator comprising a porous substrate and a porous film on or above the porous substrate, the porous film containing a fluorine-containing polymer that contains a polymerized unit based on vinylidene fluoride, a polymerized unit based on tetrafluoroethylene, and a polymerized unit based on a monomer (2-2) represented by the following formula (2-2):

[Chem. 1]

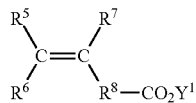

(2-2)

wherein $R^5$, $R^6$, and $R^7$ are each independently a hydrogen atom or a C1-C8 hydrocarbon group;

$R^8$ is a C2-C8 hydrocarbon group; and $Y^1$ is an inorganic cation and/or an organic cation.

2. The secondary battery separator according to claim 1, wherein the porous film further contains a particulate organic substance.

3. The secondary battery separator according to claim 1, wherein the porous film further contains at least one particulate inorganic substance selected from the group consisting of a particulate metal oxide and a particulate metal hydroxide.

4. The secondary battery separator according to claim 1, wherein the porous substrate is formed from at least one resin selected from the group consisting of polyethylene, polypropylene, polyimide, polyamide, polyethylene terephthalate, polyester, and polyacetal.

5. A secondary battery comprising:

the secondary battery separator according to claim 1;

a positive electrode;

a negative electrode; and a non-aqueous electrolyte solution.

* * * * *